United States Patent
Chen

(10) Patent No.: US 12,107,771 B2
(45) Date of Patent: Oct. 1, 2024

(54) EFFICIENT REPORTING OF SYSTEM RESOURCE HEALTH STATUS

(71) Applicant: SAP SE, Walldorf (DE)

(72) Inventor: Wei Chen, Shanghai (CN)

(73) Assignee: SAP SE, Walldorf (DE)

( * ) Notice: Subject to any disclaimer, the term of this patent is extended or adjusted under 35 U.S.C. 154(b) by 339 days.

(21) Appl. No.: 17/860,508

(22) Filed: Jul. 8, 2022

(65) Prior Publication Data

US 2024/0015111 A1    Jan. 11, 2024

(51) Int. Cl.
*H04L 47/78*   (2022.01)
*H04L 47/762*  (2022.01)
*H04L 47/783*  (2022.01)
*H04L 47/83*   (2022.01)

(52) U.S. Cl.
CPC .......... *H04L 47/762* (2013.01); *H04L 47/783* (2013.01); *H04L 47/788* (2013.01); *H04L 47/83* (2022.05)

(58) Field of Classification Search
None
See application file for complete search history.

(56) References Cited

U.S. PATENT DOCUMENTS

| | | | |
|---|---|---|---|
| 12,034,531 B2* | 7/2024 | Wei | H04L 1/0061 |
| 12,035,159 B2* | 7/2024 | Cui | H04W 24/08 |
| 2009/0316581 A1* | 12/2009 | Kashyap | H04L 43/0811 |
| | | | 370/236 |
| 2019/0174449 A1* | 6/2019 | Shan | H04W 60/04 |

* cited by examiner

*Primary Examiner* — Ajit Patel
(74) *Attorney, Agent, or Firm* — SCHWEGMAN LUNDBERG & WOESSNER, P.A.

(57) ABSTRACT

Techniques for efficient reporting of a health status of a system resource are disclosed. In some embodiments, a computer system performs a method comprising: computing a connection failure rate value of a resource based on connection failure rate data indicating a rate at which requests to connect to the resource failed; computing an operation failure rate value of the resource based on operation failure rate data indicating a rate at which requests for the resource to execute a resource operation failed; determining that the connection failure rate value satisfies a connection failure condition or the operation failure rate value satisfies an operation failure condition; based on the determining that the connection failure rate value or the operation failure rate value satisfies its respective failure condition, attempting to establish a connection to the resource; and determining a status of the resource based on the attempting to establish the connection.

20 Claims, 6 Drawing Sheets

EFFICIENT REPORTING OF SYSTEM RESOURCE HEALTH STATUS

BACKGROUND

A system resource may be any physical or virtual component of a computer system. The health status of a system resource can change from moment to moment. Sometimes the health status of a system resource is up, meaning that the system resource is available for use, and sometimes the health status of a system resource is down, meaning that the system resource is not available for use, such as when a system crashes or power outage occurs.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
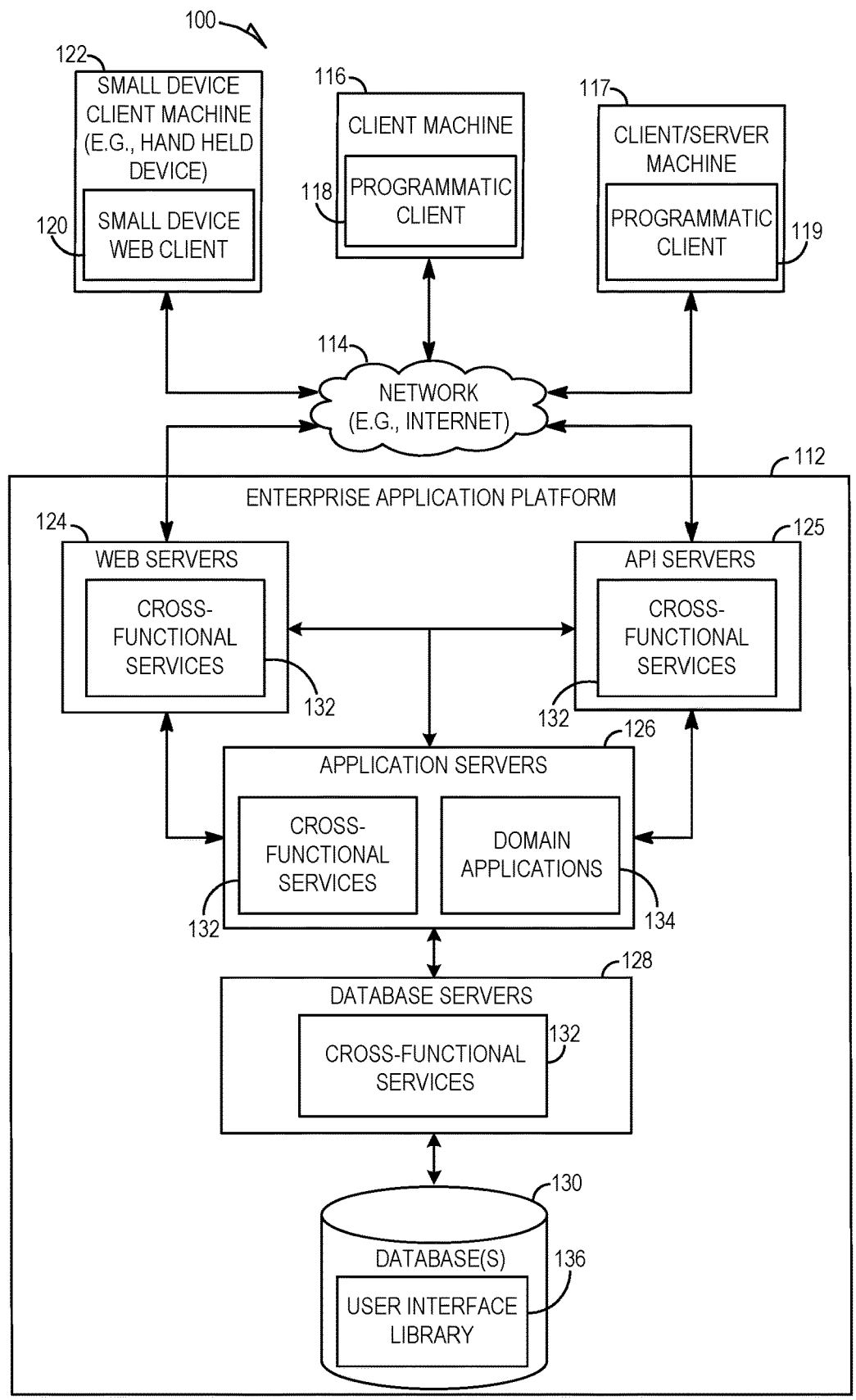
FIG. 1 is an example network diagram illustrating a system.

Example methods and systems for efficiently reporting a health status of a system resource are disclosed. In the following description, for purposes of explanation, numerous specific details are set forth in order to provide a thorough understanding of example embodiments. It will be evident, however, to one skilled in the art that the present embodiments can be practiced without these specific details.

One way to determine a health status of a system resource is to, in response to receiving a request for the health status of the system resource, attempt to establish a connection with the system resource and then, if the connection with the system resource is established, request that a resource operation of the system resource be executed by the system resource. If a failure occurs in either establishing a connection with the system resource or in executing the resource operation, then the health status of the system resource may be determined to be a down status, indicating that the system resource is not available for use. Otherwise, if a connection is successfully established with the system resource and the requested resource operation is successfully executed, then the health status of the system may be determined to be an up status, indicating that the system resource is available for use.

Technical problems arise when using the approach discussed above. First, the above-discussed approach results in an excessive consumption of electronic resources. For example, establishing a connection with the system resource every time that a health status is requested involves the consumption of a significant amount of network bandwidth, especially when the health status is frequently requested. Similarly, executing a resource operation every time that a health status is requested significantly increases the workload of the system resource, especially when the health statis is frequently requested.

Second, the above-discussed approach is vulnerable to making inaccurate determinations regarding the health status of the system resource. For example, the attributes of the resource operation being requested are fixed and as simple as possible, thereby not accurately reflecting the actual specific real-world workload demands on the system resource. Additionally, a single resource operation request that results in a successful execution may lead to an inaccurate determination that the health status of the system resource is up, since several other resource operation requests submitted around the same time as the single resource operation request may result in a failed execution.

As a result of using the above-discussed approach, the functioning of the computer system employing this approach, as well as the system resource and its associated components, suffers. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to provide efficient reporting of a health status of a system resource. In some example embodiments, a computer system computes a connection failure rate value of a system resource for a period of time based on a set of connection failure rate data, where the set of connection failure rate data indicates a rate at which requests to connect to the system resource failed during the period of time, and also computed an operation failure rate value of the system resource for the period of time based on a set of operation failure rate data, where the set of connection failure rate data indicates a rate at which requests for the system resource to execute a resource operation failed during the period of time. The computer system may determine a status of the system resource based on the connection failure rate value and the operation failure rate value. For example, if the connection failure rate value does not satisfy a connection failure condition (e.g., the connection failure rate value is below a connection failure threshold value) and the operation failure rate value does not satisfy an operation failure condition (e.g., the operation failure rate value is below an operation failure threshold value), then the computer system may determine that the status of the system resource is an up status without having to establish a connection with the system resource and request that a resource operation be executed by the system resource in order to make a status determination.

By using a set of connection failure rate data indicating a rate at which requests to connect to the system resource failed during the period of time and a set of connection failure rate data indicating a rate at which requests for the system resource to execute a resource operation failed during the period of time, the computer system is able determine the status of the system resource efficiently and effectively, avoiding excessive consumption of electronic resources associated with establishing a connection and requesting the execution of a resource operation, as well as accurately reflecting the actual specific real-world workload demands on the system resource over a period of time rather than basing the status determination on a single fixed request for the execution of a resource operation. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
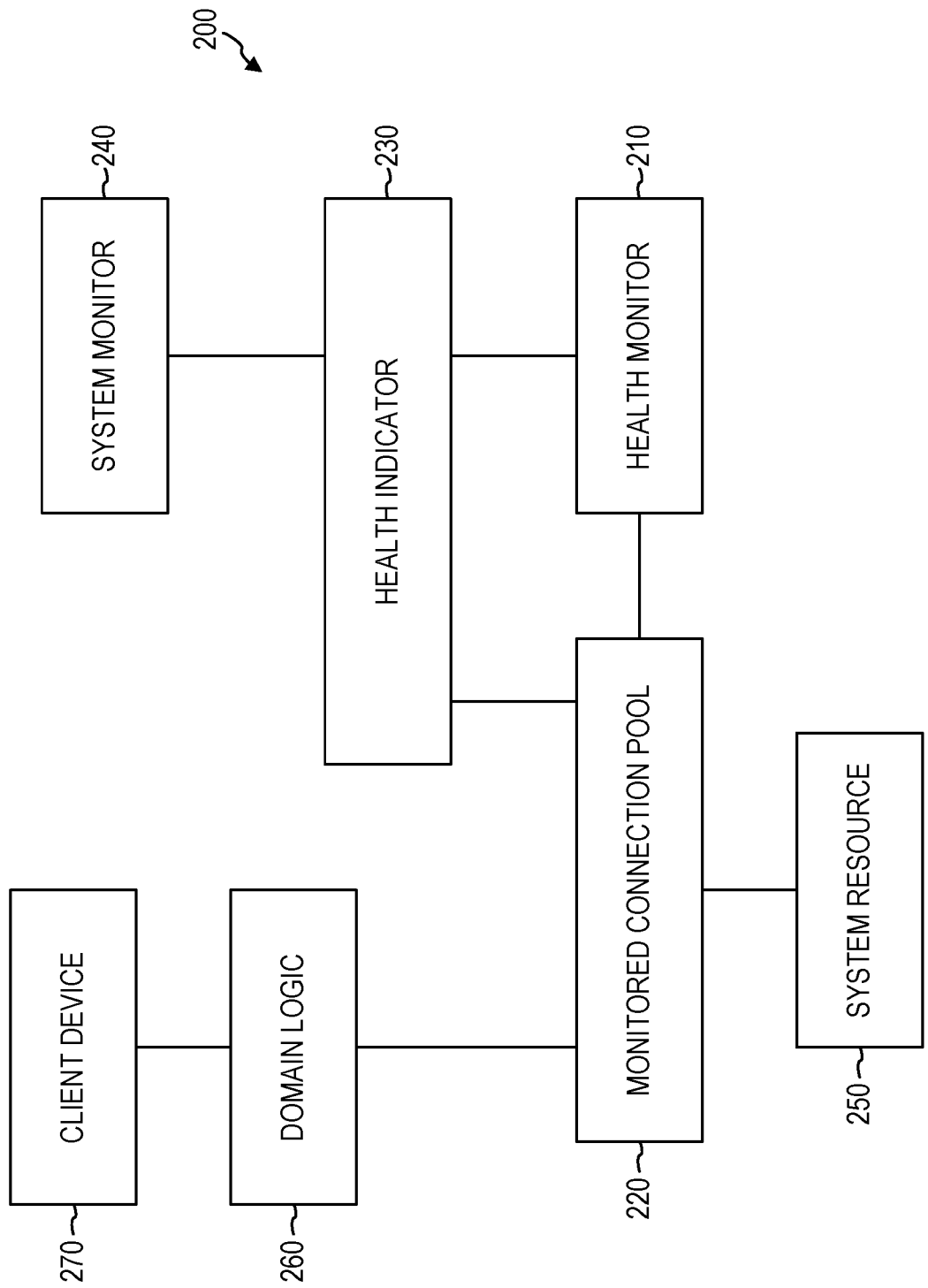
FIG. 2 is a block diagram illustrating an example health reporting system.

FIG. 2 is a block diagram illustrating an example health reporting system 200. The components shown in FIG. 2 may be configured to communicate with each other via one or more network connections. In some example embodiments, the health reporting system 200 comprises any combination of one or more of a health monitor 210, a monitored connection pool 220, and a health indicator 230. One or more of the components of the health reporting system 200 may be implemented by the enterprise application platform 112 of FIG. 1. For example, the health monitor 210, the monitored connection pool 220, and the health indicator 230 may be incorporated into the application server(s) 126 or the database servers 128. However, the health reporting system 200 may be implemented in other ways as well.

The health reporting system 200 may be configured to proactively monitor the usage of a system resource 250 in a given time period (e.g., a given time window). In some example embodiments, the system resource 250 comprises a database. However, other types of system resources 250 are also within the scope of the present disclosure, such as any physical or virtual component of a computer system. The system resource 250 may be configured to perform one or more resource operations. For example, if the system resource 250 comprises a database, then the system resource 250 may be configured to execute database operations, such as operations based on structured query language (SQL) statements. The system resource 250 may comprise a system resource 250 of a microservice architecture. A microservice architecture is a variant of the service-oriented architecture structural style in which an application is arranged as a collection of loosely coupled services. The system resource 250 may comprise a system resource 250 of another type of service-oriented architecture as well.

The system resource 250 may be used by one or more client devices 270 (e.g., client machine 116 or 122 in FIG. 1). Each client device 270 may submit a request to a domain logic 260. The domain logic 260 may comprise a part of a program that encodes the real-world rules that determine how data can be created, stored, and changed with respect to the system resource 250. The domain logic 260 may manage communication between the client device 270 and the system resource 250.

In some example embodiments, the health reporting system 200 is configured to determine the status of the system resource 250 based on connection failure rate data corresponding to a period of time and operation failure rate data corresponding to the same period of time. The connection failure rate data may indicate a rate at which requests to connect to the system resource 250 failed during the period of time, while the operation failure rate data may indicate a rate at which requests for the system resource 250 to execute a resource operation failed during the period of time. For example, the connection failure rate data may comprise a total count of requests to connect to the system resource 250 that have been received during the period of time and a total count of those connection requests that have failed to connect to the system resource 250, and the operation failure rate data may comprise a total count of requests for a resource operation to be executed by the system resource 250 that have been received during the period of time and a total count of those operation requests that have failed. The health reporting system 200 may determine that an operation request has failed based on a determination that an exception has been raised that prevents or terminates the execution of the requested resource operation or a determination that there has been a failure to execute the requested resource operation within a threshold amount of time.

In some example embodiments, the health reporting system 200 may store the connection failure rate data and the operation failure rate data for subsequent use in determining the status of the system resource 250. For example, the health monitor 210 may work with the monitored connection pool 220 to store the connection failure rate data and the operation failure rate data. The monitored connection pool 220 may monitor a connection pool for the system resource 250. A connection pool is a cache of connections to a system resource and is maintained so that the connections can be reused when future requests to the system resource are required. Connection pools are used to enhance the performance of executing commands on the system resource 250. After a connection is created between a device (e.g., the client device 270) and the system resource 250, the created connection is placed in the connection pool and it is used again so that a new connection does not have to be established between the device and the system resource 250.

In some example embodiments, the monitored connection pool 220 monitors if a connection to the system resource 250 can be obtained by a device that is requesting the connection (e.g., the client device 270), and reports an error to the health monitor 210 if a connection to the system resource 250 cannot be obtained. The monitored connection pool 220 may also monitor connections that have been established between the system resource 250 and devices, and report any error associated with the connections to the health monitor 210. For example, the monitored connection pool 220 may detect and report to the health monitor 210 any exceptions or other types of errors that have been raised in association with any of the connections to the system resource 250. An exception is an anomalous or exceptional condition, during the execution of a program, that requires special processing, such as the unavailability of a resource. A connection that is returned from the connection pool to the domain logic 260 may comprise a wrapper of the original connection from the connection pool. When there is an exception thrown, the wrapper may report the error immediately to the health monitor 210 and rethrow the exception to the client device 270 or another caller device. The monitored connection pool 220 may determine the total count of connection requests that have failed to connect to the system resource 250 by maintaining a count of the exceptions that are thrown in response to a failed attempt to establish a connection with the system resource 250.

In some example embodiments, the health monitor 210 maintains the statistical data about the errors reported from the monitored connection pool 220. The statistical data may be composed of N slices of statistical data, where N is a positive integer. Each slice of the statistical data is an aggregated result of the errors reported from the monitored connection pool 220 in a fixed interval (e.g., in a fixed interval of one second). In the fixed interval, the connection failure rate data and the operation failure rate data may be aggregated. The connection failure rate data may comprise the total count of requests to obtain a connection with the system resource 250 and the total count of those requests that failed to obtain a connection with the system resource 250. The operation failure rate data may comprise the total count of requests of resource operations submitted to the system resource 250 and the total count of those requested resource operations that failed to be successfully executed (e.g., total count of exceptions that were raised when the requested resource operations were submitted and applied).

In some example embodiments, the health monitor 210 may maintain the connection failure rate data and the operation failure rate data in a data structure, such as shown below:

```
IntervalData: Structure of {
    countOfRequests: long,
    countOfFailRequest: long,
    countOfOperations: long,
    countOfFailOperations: long
}
```

The health monitor 210 may create a ring buffer to host the N slices of the aggregated connection failure rate data and operation failure rate data. A ring buffer is a data structure that uses a single fixed-size buffer as if it were connected end-to-end. In some example embodiments, the ring buffer always keep the latest data in the most recent N intervals.

Figure 3:
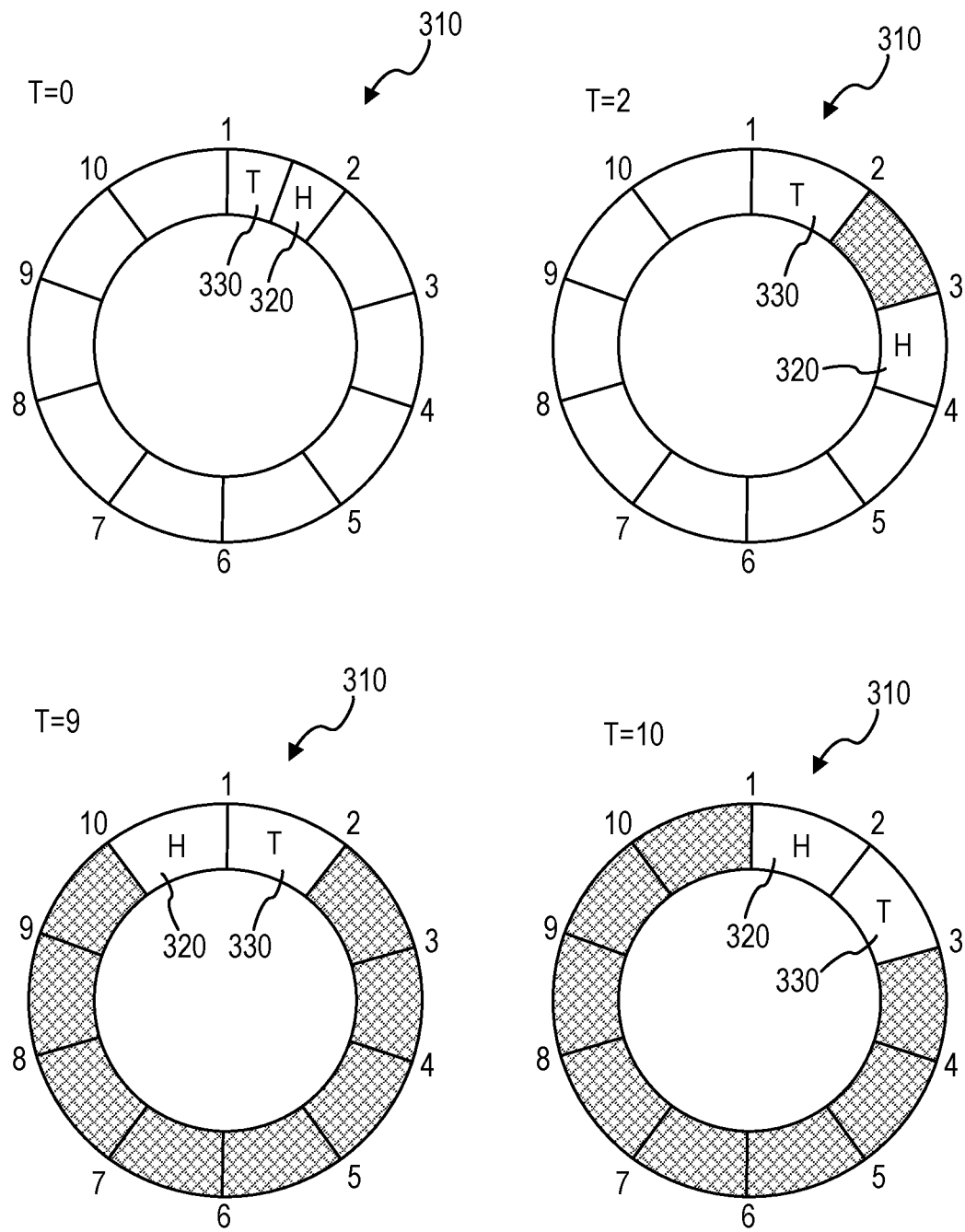
FIG. 3 illustrates an example ring buffer at different times.

FIG. 3 illustrates an example ring buffer 310 at different times. In the example shown in FIG. 3, the ring buffer 310 comprises ten positions, with each position configured to store a slice of the aggregated connection failure rate data and operation failure rate data. The ring buffer 310 is shown at time (T)=0, T=2, T=9, and T=10. The ring buffer 310 comprises a head pointer 320 and a tail pointer 330.

In some example embodiments, the following operational flow may be used to manage the ring buffer:
 1. The health monitor 210 creates an array of IntervalData with its length=N, such as IntervalData[ ] ring=new IntervalData[N].
 2. Initialize two pointers Head=1 and Tail=1.
 3. When there is a new report from the monitored connection pool 220, get the IntervalData[Head], and update the data of IntervalData[Head].

The ring buffer may employ the following task to update the head pointer 320 and the tail pointer 330, with the task being scheduled repeatedly:
 a. Let Head=(Head+1) mod N.
 b. If Head=Tail, Let Tail=(Tail+1) mod N.

In the example shown in FIG. 3, at T=0, the head pointer 320 and the tail pointer 330 are at position 1 of the ring buffer, with positions 2-10 of the ring buffer 310 being empty (e.g., not filled in with any of the aggregated connection failure rate data and operation failure rate data). At T=2, the head pointer 320 has moved to position 3 and the tail pointer 330 has remained at position 1, with positions 1 and 2 of the ring buffer 310 having been filled in with the aggregated connection failure rate data and operation failure rate data, and positions 4-10 of the ring buffer 310 being empty. At T=9, the head pointer 320 has moved to position 10 and the tail pointer 330 has remained at position 1, with positions 1 to 9 of the ring buffer 310 having been filled in with the aggregated connection failure rate data and operation failure rate data. At T=10, the tail pointer 330 has moved to position 2, since the head pointer 320 has moved back to position 1, and all of the positions of the ring buffer 310 have been filled in with the aggregated connection failure rate data and operation failure rate data.

It is contemplated that other implementations of the ring buffer 310 may be employed by the health monitor 210. Furthermore, the health monitor 210 may use other types of data structures or other types of data storage techniques to store or otherwise manage the aggregated connection failure rate data and operation failure rate data.

In some example embodiments, the health monitor 210 can evaluate the health status of the system resource 250 at any time based on the aggregated connection failure rate data and operation failure rate data. The health monitor 210 may evaluate the status of the system resource 250 based on a request from a system monitor 240. A system monitor 240 is a hardware or software component used to monitor system resources and performance in a computer system. A system resource may comprise any physical or virtual component within a computer system. The system monitor 240 may transmit a request for the status of the system resource 250 to the health indicator 230, which may communicate with the health monitor 210 to determine the status of the system resource 250. Once the status of the system resource 250 is determined, the health indicator 230 may transmit the status of the system resource 250 to the system monitor 250. It is contemplated that the status of the system resource 250 may be requested by or transmitted to other types of hardware or software components other than the system monitor 240.

Before evaluating the health status of the system resource 250, the health monitor 210 may first determine if there is enough aggregated data to evaluate the health status of the system resource 250. It is normal for some system resources 250 to have little traffic or even no traffic at all during a specific period of time. As a result, for these time periods, there may be few or no aggregated data in the ring buffer 310. In some example embodiments, the health monitor 210 may employ a connection data threshold value ($T_r$) for the requests to obtain a connection with the system resource 250 and an operation data threshold value ($T_o$) for the requested resource operations submitted to system resource 250 to determine how to compute the status of the system resource 250. For example, the health monitor 210 may condition the use of the aggregated connection failure rate data and operation failure rate determining the status of the system resource 250 on both of the following conditions being satisfied:

$$\sum_{i=Tail}^{Head} Cr_i < T_r \text{ and } \sum_{i=Tail}^{Head} Or_i < T_o,$$

where $Cr_i$ is the total count of requests to connect to the system resource 250 and $Or_i$ is total count of requests for a resource operation to be executed by the system resource 250.

When both of the above conditions are satisfied, the health monitor 210 may use the aggregated connection failure rate data and operation failure rate in determining the status of the system resource 250. Otherwise, the health monitor 210 may report an error to the health indicator 230 to indicate that there is not enough aggregated data to provide a report. If the health monitor 210 reports an error, then the health indicator 230 may attempt to obtain a connection with the system resource 250 and submit a request to the system resource 250 to execute a resource operation in order to check the status of the system resource 250. If the two conditions above are satisfied, then the health monitor 210 may determine the status of the system resource 250 based on a computed connection failure rate value of the system resource 250 for a period of time based on the connection failure rate data corresponding to the period of time and on a computed operation failure rate value of the system resource 250 for the period of time based on the operation failure rate data corresponding to the period of time. In computing the connection failure rate value and the operation failure rate value, the health monitor 210 may weight each corresponding connection failure rate data and each corresponding operation failure rate data, respectively, based on its time interval, where the weighting of each corresponding failure rate data is applied in direct proportion to a level of recency of the corresponding time interval, such that the failure rate data of the most recent time interval is given the highest weight, the failure rate data of the second most recent time interval is given the second highest weight, and so on and so forth until the failure rate data of the least recent time interval, which is given the least weight in the computation of the respective failure rate value.

The health monitor 210 may determine if the connection failure rate value satisfies a connection failure condition or if the operation failure rate value satisfies an operation failure condition. For example, the health monitor 210 may determine whether the connection failure rate value is equal to or greater than a threshold value for the connection failure condition and whether the operation failure rate value is equal to or greater than a threshold value for the operation failure condition. If neither the connection failure rate value nor the operation failure rate value satisfies their respective failure conditions, then the health monitor 210 may determine that the status of the system resource 250 is an up status. If either the connection failure rate value or the operation failure rate value satisfies their respective failure conditions, then the health monitor 210 may instruct the health indicator 230 to determine the status of the system resource 250 by attempting to obtain a connection with the system resource 250 and submitting a request for the system resource 250 to execute a resource operation.

Figure 4:
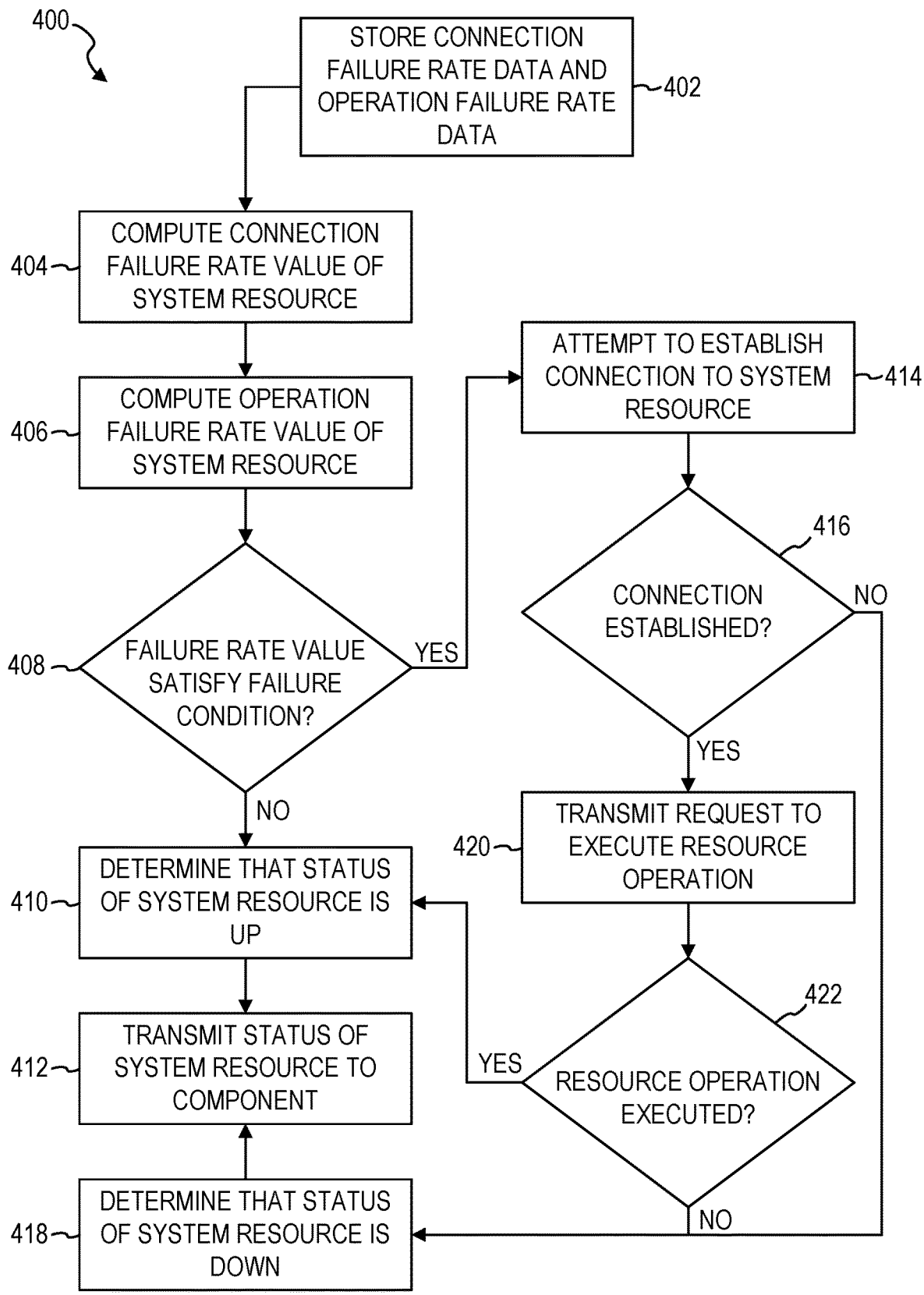
FIG. 4 is a flowchart illustrating an example method of efficiently reporting a health status of a system resource.

FIG. 4 is a flowchart illustrating an example method 400 of efficiently reporting a health status of a system resource. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the health reporting system 200 of FIG. 2 or any combination of one or more of its components (e.g., the health indicator 210, the health monitor 220, the monitored connection pool 230).

At operation 402, the health reporting system 200 may store connection failure rate data corresponding to a period of time and operation failure rate data corresponding to the period of time. In some example embodiments, the connection failure rate data indicates a rate at which requests to connect to a system resource 250 failed during the period of time, and the operation failure rate data indicates a rate at which requests for the system resource 250 to execute a resource operation failed during the period of time. For example, the connection failure rate data may comprise a total count of requests to connect to the system resource 250 that have been received during the period of time and a total count of those connection requests that have failed to connect to the system resource 250, and the operation failure rate data may comprise a total count of requests for a resource operation to be executed by the system resource 250 that have been received during the period of time and a total count of those operation requests that have failed (e.g., an exception is raised that prevents or terminates the execution of the requested resource operation, failure to execute the requested resource operation within a threshold amount of time).

In some example embodiments, the connection failure rate data and the operation failure rate data are stored in a ring buffer. However, the connection failure rate data and the operation failure rate data may be stored using other types of data structures and data storage techniques. The connection failure rate data may comprise a corresponding connection failure rate data for each time interval of a plurality of time intervals of the period of time, and the operation failure rate data may comprise a corresponding operation failure rate data for each time interval of the plurality of time intervals of the period of time. For example, the period of time may comprise a total of ten time intervals, with each of the ten time intervals being one second in duration. In this example, the connection failure rate data may comprise a corresponding connection failure rate data for each one second time interval, such that ten distinct instances of connection failure rate data are stored in association with their corresponding time intervals of the period of time. Similarly, the operation failure rate data may comprise a corresponding operation failure rate data for each one second time interval, such that ten distinct instances of operation failure rate data are stored in associated with their corresponding time intervals of the period of time.

In some example embodiments, the system resource 250 comprises a database. However, other types of system resources 250 are also within the scope of the present disclosure, such as any physical or virtual component of a computer system. The system resource may comprise a system resource 250 of a microservice architecture. However, the system resource may comprise a system resource 250 of another type of service-oriented architecture.

The health reporting system 200 may, at operation 404, compute a connection failure rate value of the system resource 250 for the period of time based on the set of connection failure rate data. The computing of the connection failure rate value of the system resource 250 for the period of time may comprise accessing the set of connection failure rate data stored in the ring buffer. However, the computing of the connection failure rate value may include obtaining the connection failure rate data in other ways as well. In some example embodiments, the computing of the connection failure rate value of the system resource 250 for the period of time comprises weighting each corresponding connection failure rate data based on its time interval, where the weighting of each corresponding connection failure rate data is applied in direct proportion to a level of recency of the corresponding time interval, such that the connection failure rate data of the most recent time interval is given the highest weight, the connection failure rate data of the second most recent time interval is given the second highest weight, and so on and so forth until the connection failure rate data of the least recent time interval, which is given the least weight in the computation of the connection failure rate value.

The health reporting system 200 may compute an operation failure rate value of the system resource 250 for the period of time based on the set of operation failure rate data, at operation 406. The computing of the operation failure rate value of the system resource 250 for the period of time may comprise accessing the set of operation failure rate data stored in the ring buffer. However, the computing of the operation failure rate value may include obtaining the operation failure rate data in other ways as well. In some example embodiments, the computing of the operation failure rate value of the system resource 250 for the period of time comprises weighting each corresponding operation failure rate data based on its time interval, where the weighting of each corresponding operation failure rate data is applied in direct proportion to the level of recency of the corresponding time interval, such that the operation failure rate data of the most recent time interval is given the highest weight, the operation failure rate data of the second most recent time interval is given the second highest weight, and so on and so forth until the operation failure rate data of the least recent time interval, which is given the least weight in the computation of the operation failure rate value.

At operation 408, the health reporting system 200 may determine whether the connection failure rate value satisfies a connection failure condition or the operation failure rate value satisfies an operation failure condition. The connection failure condition and the operation failure condition may each comprise a corresponding threshold value to be equaled or exceeded by the connection failure rate value and the operation failure rate value, respectively, in order to be satisfied.

If, at operation 408, the health reporting system 200 determines that the connection failure rate value does not satisfy the connection failure condition and the operation failure rate value does not satisfy the operation failure condition, then the health reporting system 200 may determine that a status of the system resource 250 is an up status, at operation 410, in response to, or otherwise based on, the determining that the connection failure rate value does not satisfy the connection failure condition and the operation failure rate value does not satisfy the operation failure condition.

Next, the health reporting system 200 may, at operation 412, transmit the status of the system resource 250 to a hardware or software component in response to, or otherwise based on, the determining of the status of the system resource at operation 410. In some example embodiments, the hardware or software component comprises a system monitor 240. However, other types of hardware or software components are also within the scope of the present disclosure.

If, at operation 408, the health reporting system 200 determines that the connection failure rate value satisfies the connection failure condition or that the operation failure rate value satisfies the operation failure condition, then the health reporting system 200 may attempt to establish a connection to the system resource 250, at operation 414. For example, at operation 414, the health reporting system 200 may submit a request to connect to a database or some other type of system resource 250.

At operation 416, the health reporting system 200 may then determine whether the requested connection to the system resource 250 was established. If, at operation 416, the health reporting system 200 determines that the requested connection to the system resource 250 failed to be established, then the health reporting system 200 may determine that the status of the system resource 250 is a down status (e.g., unavailable for use), at operation 418, in response to, or otherwise based on, the determining that the connection to the system resource 250 failed to be established.

If, at operation 416, the health reporting system 200 determines that the requested connection to the system resource 250 was established, then the health reporting system 200 may transmit, to the system resource 250, a request to execute a resource operation of the system resource 250, at operation 420, in response to, or otherwise based on, the determining that the connection to the system resource 250 was established. The resource operation may comprise any operation that the system resource 250 performs as a service. In one example in which the system resource 250 comprises a database, the resource operation may comprise a query of the database. Other types of resource operations are also within the scope of the present disclosure.

The health reporting system 200 may, at operation 422, determine the status of the system resource 250 based on the transmitting of the request to execute the resource operation, such as by determining whether the requested resource operation successfully executed or failed to execute. If, at operation 422, the health reporting system 200 determines that the requested resource operation was successfully executed by the system resource 250, then the health reporting system 200 may determine that the status of the system resource 250 is an up status, at operation 410, in response to, or otherwise based on, the determining that the requested resource operation was successfully executed by the system resource 250. The health reporting system 200 may then transmit the status of the system resource 250 to the hardware or software component, at operation 412, in response to, or otherwise based on, the determining that the status of the system resource 250 is an up status at operation 410.

If, at operation 422, the health reporting system 200 determines that the requested resource operation failed to successfully execute, then the health reporting system 200 may determine that the status of the system resource 250 is a down status, at operation 418, in response to, or otherwise based on, the determining that the requested resource operation failed to successfully execute. The health reporting system 200 may then transmit the status of the system resource to the hardware or software component, at operation 412, in response to, or otherwise based on, the determining that the status of the system resource 250 is a down status at operation 418.

It is contemplated that any of the other features described within the present disclosure can be incorporated into the method 400.

Figure 5:
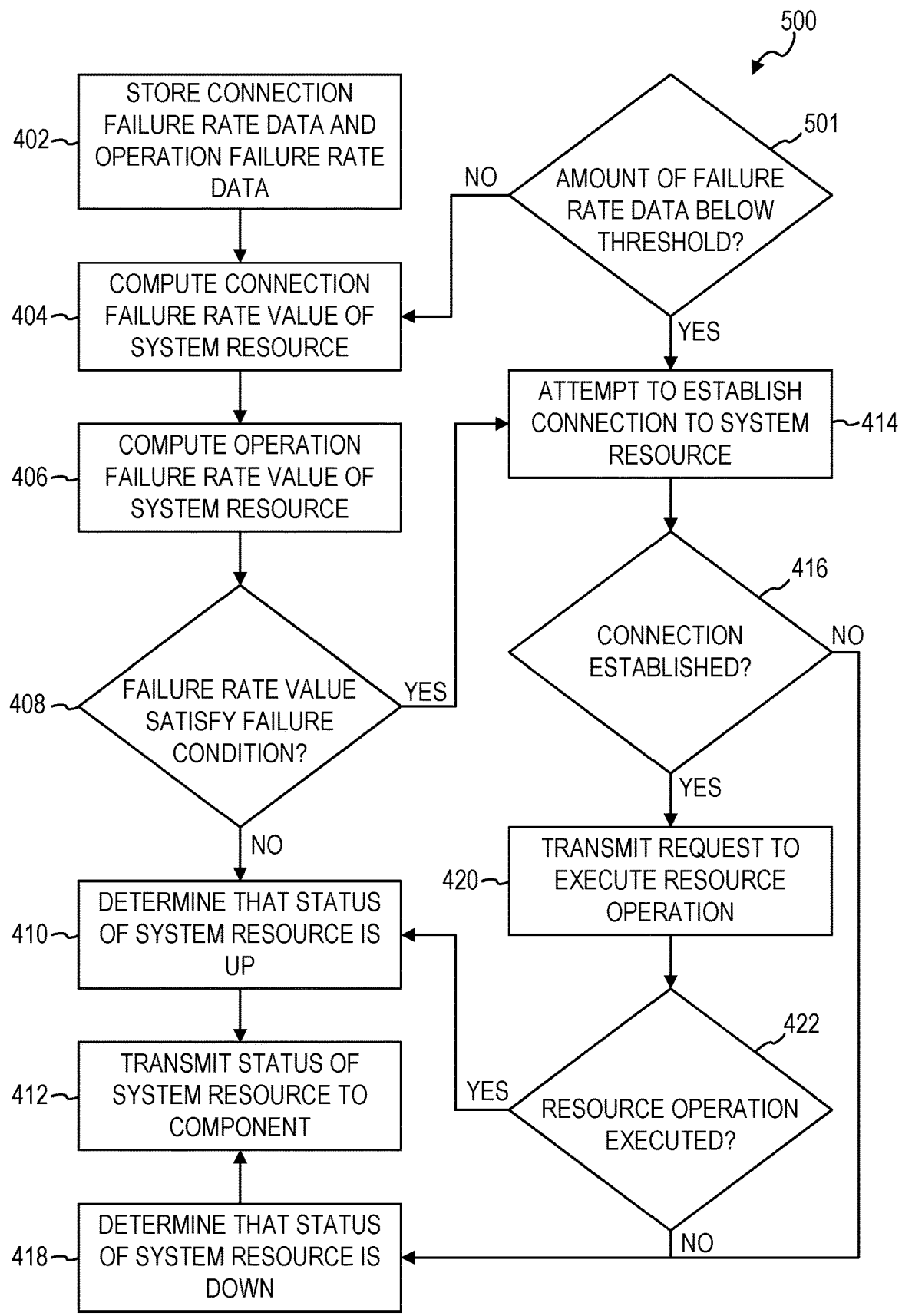
FIG. 5 is a flowchart illustrating another example method of efficiently reporting a health status of a system resource.

FIG. 5 is a flowchart illustrating another example method 500 of efficiently reporting a health status of a system resource. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the health reporting system 200 of FIG. 2 or any combination of one or more of its components (e.g., the health indicator 210, the health monitor 220, the monitored connection pool 230). The method 500 may include operation 501 being performed prior to operations 404 and 414 of the method 400.

At operation 501, the health reporting system 200 may determine whether an amount of connection failure rate data for the period of time is below a connection data threshold value or an amount of operation failure rate data for the period of time is below an operation data threshold value. If the health reporting system 200 determines that the amount of connection failure rate data for the period of time is below the connection data threshold value or that the amount of operation failure rate data for the period of time is below the operation data threshold value, then the health reporting system 200 may proceed to operation 414, where the health reporting system 200 may attempt to establish a connection to the system resource 250, and then proceed with the flow of operations of the method 400. If the health reporting system 200 determines that the amount of connection failure rate data for the period of time is not below the connection data threshold value and that the amount of operation failure rate data for the period of time is not below the operation data threshold value, then the health reporting system 200 may proceed to operation 404, where the health reporting system 200 computes the connection failure rate value of the system resource 250 for the period of time based on the connection failure rate data, and then proceed with the flow of operations of the method 400.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: computing a first connection failure rate value of a system resource for a first period of time based on a first set of connection failure rate data, the first set of connection failure rate data indicating a rate at which requests to connect to the system resource failed during the first period of time; computing a first operation failure rate value of the system resource for the first period of time based on a first set of operation failure rate data, the first set of operation failure rate data indicating a rate at which requests for the system resource to execute a resource operation failed during the first period of time; determining that the first connection failure rate value satisfies a connection failure condition or the first operation failure rate value satisfies an operation failure condition; based on the determining that the first connection failure rate value satisfies the connection failure condition or the first operation failure rate value satisfies the operation failure condition, attempting to establish a connection to the system resource; determining a first status of the system resource based on the attempting to establish the connection to the system resource; and transmitting the first status of the system resource to a hardware or software component based on the determining the first status of the system resource.

Example 2 includes the computer-implemented method of example 1, further comprising receiving a request for the first status of the system resource from the hardware or software component, wherein the transmitting the first status of the system resource is performed in response to the receiving the request for the first status.

Example 3 includes the computer-implemented method of example 1 or example 2, wherein: the first set of connection failure rate data and the first set of operation failure rate data are stored in a ring buffer; the computing the first connection failure rate value of the system resource for the first period of time comprises accessing the first set of connection failure rate data stored in the ring buffer; and the computing the first operation failure rate value of the system resource for the first period of time comprises accessing the first set of operation failure rate data stored in the ring buffer.

Example 4 includes the computer-implemented method of any one of examples 1 to 3, wherein: the first set of connection failure rate data comprises a corresponding connection failure rate data for each time interval of a plurality of time intervals of the first period of time; and the first set of operation failure rate data comprises a corresponding operation failure rate data for each time interval of the plurality of time intervals of the first period of time.

Example 5 includes the computer-implemented method of any one of examples 1 to 4, wherein: the computing the first connection failure rate value of the system resource for the first period of time comprises weighting each corresponding connection failure rate data based on its time interval, the weighting of each corresponding connection failure rate data being applied in direct proportion to a level of recency of the corresponding time interval; and the computing the first operation failure rate value of the system resource for the first period of time comprises weighting each corresponding operation failure rate data based on its time interval, the weighting of each corresponding operation failure rate data being applied in direct proportion to the level of recency of the corresponding time interval.

Example 6 includes the computer-implemented method of any one of examples 1 to 5, wherein the determining the first status of the system resource comprises: determining that the connection to the system resource failed to be established; and determining that the first status of the system resource is a down status based on the determining that the connection to the system resource failed to be established.

Example 7 includes the computer-implemented method of any one of examples 1 to 6, wherein the determining the first status of the system resource comprises: determining that the connection to the system resource was established; transmitting, to the system resource, a request to execute a resource operation of the system resource based on the determining that the connection to the system resource was established; and determining the first status of the system resource based on the transmitting of the request to execute the resource operation.

Example 8 includes the computer-implemented method of any one of examples 1 to 7, wherein the determining the first status of the system resource based on the transmitting of the request to execute the resource operation comprises: determining that the requested resource operation failed to execute; and determining that the first status of the system resource is a down status based on the determining that the requested resource operation failed to execute.

Example 9 includes the computer-implemented method of any one of examples 1 to 8, wherein the determining the first status of the system resource based on the transmitting of the request to execute the resource operation comprises: determining that the requested resource operation was executed by the system resource; and determining that the first status of the system resource is an up status based on the determining that the requested resource operation was executed by the system resource.

Example 10 includes the computer-implemented method of any one of examples 1 to 9, further comprising: computing a second connection failure rate value of the system resource for a second period of time different from the first period of time based on a second set of connection failure rate data, the second set of connection failure rate data indicating the rate at which requests to connect to the system resource failed during the second period of time; computing a second operation failure rate value of the system resource for the second period of time based on a second set of operation failure rate data, the second set of connection failure rate data indicating the rate at which requests for the system resource to execute the resource operation failed during the second period of time; determining that the second connection failure rate value does not satisfy the connection failure condition and the second operation failure rate value does not satisfy the operation failure condition; determining that a second status of the system resource is an up status based on the determining that the second connection failure rate value does not satisfy the connection failure condition and the second operation failure rate value does not satisfy the operation failure condition; and transmitting the second status of the system resource to the hardware or software component based on the determining the that the status of the system resource is an up status.

Example 11 includes the computer-implemented method of any one of examples 1 to 10, further comprising: determining that an amount of connection failure rate data for a third period of time different from the first period of time is below a connection data threshold value or an amount of operation failure rate data for the third period of time is below an operation data threshold value, the connection failure rate data for the third period of time indicating a rate at which requests to connect to the system resource failed during the third period of time, and the connection failure rate data for the third period of time indicating a rate at which requests for the system resource to execute the resource operation failed during the third period of time; based on the determining that the amount of connection failure rate data for the third period of time is below the connection data threshold value or the amount of operation failure rate data for the third time period is below the operation data threshold value, attempting to establish another connection to the system resource; determining a third status of the system resource based on the attempting to establish the another connection to the system resource; and transmitting the third status of the system resource to the hardware or software component based on the determining the third status of the system resource.

Example 12 includes the computer-implemented method of any one of examples 1 to 11, wherein the system resource comprises a database.

Example 13 includes the computer-implemented method of any one of examples 1 to 12, wherein the database comprises a database of a microservice architecture.

Example 14 includes a system comprising: at least one processor; and a non-transitory computer-readable medium storing executable instructions that, when executed, cause the at least one processor to perform the method of any one of examples 1 to 13.

Example 15 includes a non-transitory machine-readable storage medium, tangibly embodying a set of instructions that, when executed by at least one processor, causes the at least one processor to perform the method of any one of examples 1 to 13.

Example 16 includes a machine-readable medium carrying a set of instructions that, when executed by at least one processor, causes the at least one processor to carry out the method of any one of examples 1 to 13.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
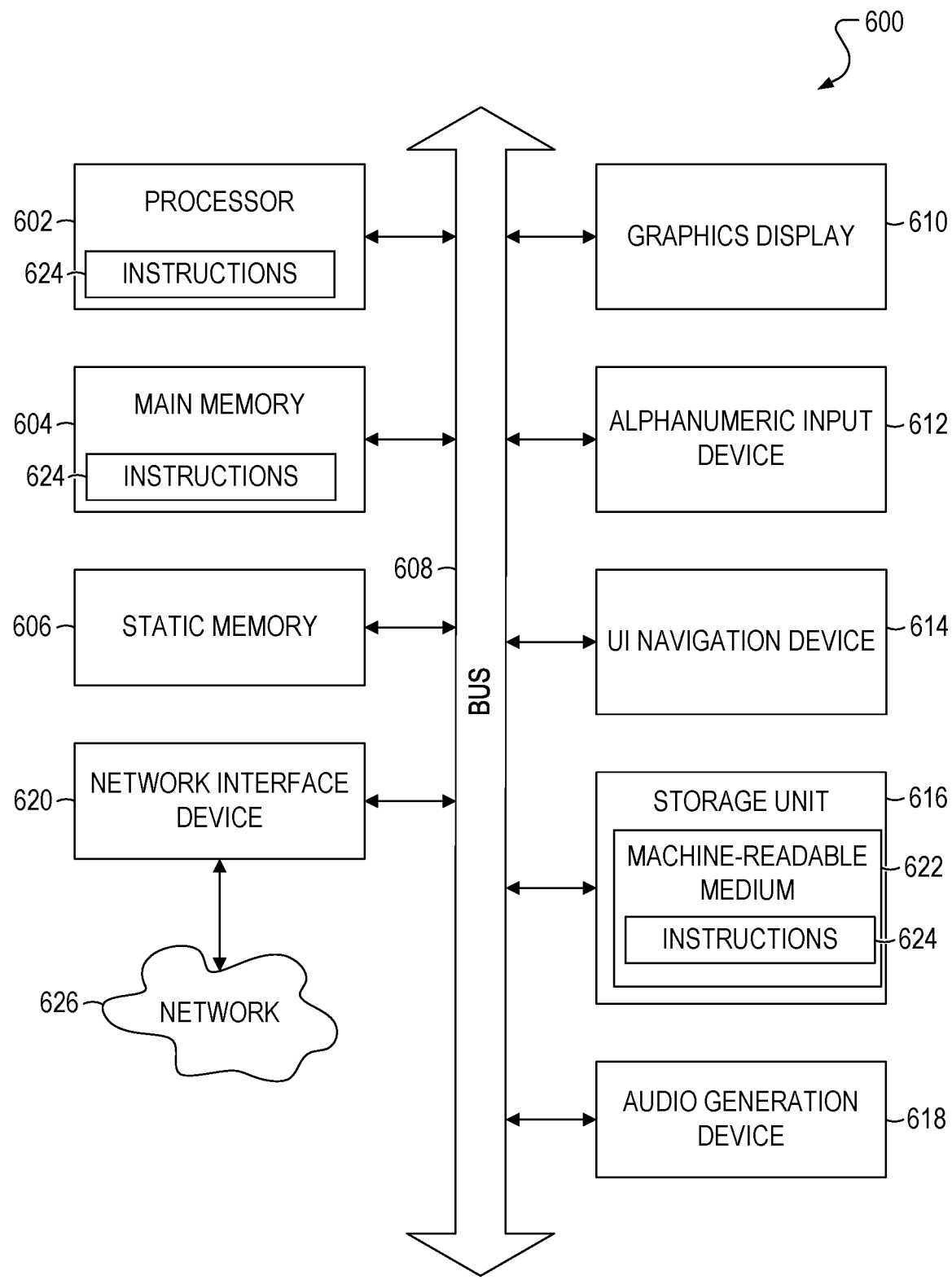
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
    computing a first connection failure rate value of a system resource for a first period of time based on a first set of connection failure rate data, the first set of connection failure rate data indicating a rate at which requests to connect to the system resource failed during the first period of time;
    computing a first operation failure rate value of the system resource for the first period of time based on a first set of operation failure rate data, the first set of operation failure rate data indicating a rate at which requests for the system resource to execute a resource operation failed during the first period of time;
    determining that the first connection failure rate value satisfies a connection failure condition or the first operation failure rate value satisfies an operation failure condition;
    based on the determining that the first connection failure rate value satisfies the connection failure condition or the first operation failure rate value satisfies the operation failure condition, attempting to establish a connection to the system resource;
    determining a first status of the system resource based on the attempting to establish the connection to the system resource; and
    transmitting the first status of the system resource to a hardware or software component based on the determining the first status of the system resource.

2. The computer-implemented method of claim 1, further comprising receiving a request for the first status of the system resource from the hardware or software component, wherein the transmitting the first status of the system resource is performed in response to the receiving the request for the first status.

3. The computer-implemented method of claim 1, wherein:
    the first set of connection failure rate data and the first set of operation failure rate data are stored in a ring buffer;
    the computing the first connection failure rate value of the system resource for the first period of time comprises accessing the first set of connection failure rate data stored in the ring buffer; and
    the computing the first operation failure rate value of the system resource for the first period of time comprises accessing the first set of operation failure rate data stored in the ring buffer.

4. The computer-implemented method of claim 1, wherein:
    the first set of connection failure rate data comprises a corresponding connection failure rate data for each time interval of a plurality of time intervals of the first period of time; and
    the first set of operation failure rate data comprises a corresponding operation failure rate data for each time interval of the plurality of time intervals of the first period of time.

5. The computer-implemented method of claim 4, wherein:
    the computing the first connection failure rate value of the system resource for the first period of time comprises weighting each corresponding connection failure rate data based on its time interval, the weighting of each corresponding connection failure rate data being applied in direct proportion to a level of recency of the corresponding time interval; and
    the computing the first operation failure rate value of the system resource for the first period of time comprises weighting each corresponding operation failure rate data based on its time interval, the weighting of each corresponding operation failure rate data being applied in direct proportion to the level of recency of the corresponding time interval.

6. The computer-implemented method of claim 1, wherein the determining the first status of the system resource comprises:
    determining that the connection to the system resource failed to be established; and
    determining that the first status of the system resource is a down status based on the determining that the connection to the system resource failed to be established.

7. The computer-implemented method of claim 1, wherein the determining the first status of the system resource comprises:
    determining that the connection to the system resource was established;
    transmitting, to the system resource, a request to execute a resource operation of the system resource based on the determining that the connection to the system resource was established; and
    determining the first status of the system resource based on the transmitting of the request to execute the resource operation.

8. The computer-implemented method of claim 7, wherein the determining the first status of the system resource based on the transmitting of the request to execute the resource operation comprises:
- determining that the requested resource operation failed to execute; and
- determining that the first status of the system resource is a down status based on the determining that the requested resource operation failed to execute.

9. The computer-implemented method of claim 7, wherein the determining the first status of the system resource based on the transmitting of the request to execute the resource operation comprises:
- determining that the requested resource operation was executed by the system resource; and
- determining that the first status of the system resource is an up status based on the determining that the requested resource operation was executed by the system resource.

10. The computer-implemented method of claim 1, further comprising:
- computing a second connection failure rate value of the system resource for a second period of time different from the first period of time based on a second set of connection failure rate data, the second set of connection failure rate data indicating the rate at which requests to connect to the system resource failed during the second period of time;
- computing a second operation failure rate value of the system resource for the second period of time based on a second set of operation failure rate data, the second set of connection failure rate data indicating the rate at which requests for the system resource to execute the resource operation failed during the second period of time;
- determining that the second connection failure rate value does not satisfy the connection failure condition and the second operation failure rate value does not satisfy the operation failure condition;
- determining that a second status of the system resource is an up status based on the determining that the second connection failure rate value does not satisfy the connection failure condition and the second operation failure rate value does not satisfy the operation failure condition; and
- transmitting the second status of the system resource to the hardware or software component based on the determining the that the status of the system resource is an up status.

11. The computer-implemented method of claim 1, further comprising:
- determining that an amount of connection failure rate data for a third period of time different from the first period of time is below a connection data threshold value or an amount of operation failure rate data for the third period of time is below an operation data threshold value, the connection failure rate data for the third period of time indicating a rate at which requests to connect to the system resource failed during the third period of time, and the connection failure rate data for the third period of time indicating a rate at which requests for the system resource to execute the resource operation failed during the third period of time;
- based on the determining that the amount of connection failure rate data for the third period of time is below the connection data threshold value or the amount of operation failure rate data for the third time period is below the operation data threshold value, attempting to establish another connection to the system resource;
- determining a third status of the system resource based on the attempting to establish the another connection to the system resource; and
- transmitting the third status of the system resource to the hardware or software component based on the determining the third status of the system resource.

12. The computer-implemented method of claim 1, wherein the system resource comprises a database.

13. The computer-implemented method of claim 12, wherein the database comprises a database of a microservice architecture.

14. A system of comprising:
- at least one hardware processor; and
- a non-transitory computer-readable medium storing executable instructions that, when executed, cause the at least one processor to perform computer operations comprising:
  - computing a first connection failure rate value of a system resource for a first period of time based on a first set of connection failure rate data, the first set of connection failure rate data indicating a rate at which requests to connect to the system resource failed during the first period of time;
  - computing a first operation failure rate value of the system resource for the first period of time based on a first set of operation failure rate data, the first set of operation failure rate data indicating a rate at which requests for the system resource to execute a resource operation failed during the first period of time;
  - determining that the first connection failure rate value satisfies a connection failure condition or the first operation failure rate value satisfies an operation failure condition;
  - based on the determining that the first connection failure rate value satisfies the connection failure condition or the first operation failure rate value satisfies the operation failure condition, attempting to establish a connection to the system resource;
  - determining a first status of the system resource based on the attempting to establish the connection to the system resource; and
  - transmitting the first status of the system resource to a hardware or software component based on the determining the first status of the system resource.

15. The system of claim 14, wherein the computer operations further comprise receiving a request for the first status of the system resource from the hardware or software component, and the transmitting the first status of the system resource is performed in response to the receiving the request for the first status.

16. The system of claim 14, wherein:
- the first set of connection failure rate data and the first set of operation failure rate data are stored in a ring buffer;
- the computing the first connection failure rate value of the system resource for the first period of time comprises accessing the first set of connection failure rate data stored in the ring buffer; and
- the computing the first operation failure rate value of the system resource for the first period of time comprises accessing the first set of operation failure rate data stored in the ring buffer.

17. The system of claim 14, wherein:
the first set of connection failure rate data comprises a corresponding connection failure rate data for each time interval of a plurality of time intervals of the first period of time; and
the first set of operation failure rate data comprises a corresponding operation failure rate data for each time interval of the plurality of time intervals of the first period of time.

18. The system of claim 17, wherein:
the computing the first connection failure rate value of the system resource for the first period of time comprises weighting each corresponding connection failure rate data based on its time interval, the weighting of each corresponding connection failure rate data being applied in direct proportion to a level of recency of the corresponding time interval; and
the computing the first operation failure rate value of the system resource for the first period of time comprises weighting each corresponding operation failure rate data based on its time interval, the weighting of each corresponding operation failure rate data being applied in direct proportion to the level of recency of the corresponding time interval.

19. The system of claim 14, wherein the determining the first status of the system resource comprises:
determining that the connection to the system resource failed to be established; and
determining that the first status of the system resource is a down status based on the determining that the connection to the system resource failed to be established.

20. A non-transitory machine-readable storage medium tangibly embodying a set of instructions that, when executed by at least one hardware processor, causes the at least one processor to perform computer operations comprising:
computing a first connection failure rate value of a system resource for a first period of time based on a first set of connection failure rate data, the first set of connection failure rate data indicating a rate at which requests to connect to the system resource failed during the first period of time;
computing a first operation failure rate value of the system resource for the first period of time based on a first set of operation failure rate data, the first set of operation failure rate data indicating a rate at which requests for the system resource to execute a resource operation failed during the first period of time;
determining that the first connection failure rate value satisfies a connection failure condition or the first operation failure rate value satisfies an operation failure condition;
based on the determining that the first connection failure rate value satisfies the connection failure condition or the first operation failure rate value satisfies the operation failure condition, attempting to establish a connection to the system resource;
determining a first status of the system resource based on the attempting to establish the connection to the system resource; and
transmitting the first status of the system resource to a hardware or software component based on the determining the first status of the system resource.

* * * * *